(12) United States Patent
Andoralov et al.

(10) Patent No.: US 11,398,357 B2
(45) Date of Patent: Jul. 26, 2022

(54) ALUMINUM POLYMER CAPACITOR WITH ENHANCED INTERNAL CONDUCTANCE AND BREAKDOWN VOLTAGE CAPABILITY

(71) Applicant: KEMET Electronics Corporation, Fort Lauderdale, FL (US)

(72) Inventors: Victor Andoralov, Évora (PT); Miguel Evaristo, Évora (PT); Rui A. Monteiro, Évora (PT); Philip M. Lessner, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 37 days.

(21) Appl. No.: 17/197,225

(22) Filed: Mar. 10, 2021

(65) Prior Publication Data

US 2021/0193400 A1 Jun. 24, 2021

Related U.S. Application Data

(62) Division of application No. 16/558,500, filed on Sep. 3, 2019, now Pat. No. 11,152,161.

(51) Int. Cl.
*H01G 11/56* (2013.01)
*H01G 11/48* (2013.01)
*H01G 11/04* (2013.01)
*H01G 11/74* (2013.01)

(52) U.S. Cl.
CPC ............ *H01G 11/48* (2013.01); *H01G 11/04* (2013.01); *H01G 11/56* (2013.01); *H01G 11/74* (2013.01)

(58) Field of Classification Search
None
See application file for complete search history.

(56) References Cited

U.S. PATENT DOCUMENTS

| | | | | |
|---|---|---|---|---|
| 5,914,852 A * | 6/1999 | Hatanaka | ............... | H01G 11/56 361/523 |
| 6,519,137 B1 * | 2/2003 | Nitta | ............... | H01G 9/15 29/25.03 |
| 7,859,829 B2 * | 12/2010 | Kakuma | ............... | H01G 9/028 361/519 |
| 7,872,858 B2 * | 1/2011 | Kakuma | ............... | H01G 11/56 361/519 |
| 8,953,304 B2 * | 2/2015 | Kato | ............... | H01G 9/02 361/523 |
| 10,068,713 B2 * | 9/2018 | Andoralov | ............ | H01G 9/151 |
| 10,475,591 B2 * | 11/2019 | Vilc | ............ | H01G 9/0032 |
| 10,522,297 B2 * | 12/2019 | Kubo | ............ | H01G 9/02 |
| 10,763,046 B2 * | 9/2020 | Petrzilek | ............ | H01G 9/15 |

(Continued)

*Primary Examiner* — Dion R. Ferguson
(74) *Attorney, Agent, or Firm* — Joseph T. Guy; Patent Filing Specialist Inc.

(57) ABSTRACT

An improved capacitor is provided. The capacitor comprises a working element wherein the working element comprises an anode comprising a first dielectric on the anode, a cathode and a conductive separator between the first dielectric and cathode. The conductive separator comprises a separator and a first conductive polymer wherein the first conductive polymer at least partially encapsulates the separator. A second conductive polymer at least partially encapsulates the first conductive polymer and wherein the first conductive polymer has a higher conductivity than the second conductive polymer. An anode lead is in electrical contact with the anode and a cathode lead is in electrical contact with the cathode.

25 Claims, 5 Drawing Sheets

(56) References Cited

U.S. PATENT DOCUMENTS

| | | | |
|---|---|---|---|
| 10,770,240 B2 * | 9/2020 | Andoralov | H01G 11/32 |
| 10,790,095 B2 * | 9/2020 | Tsuda | H01G 9/035 |
| 2012/0196062 A1 * | 8/2012 | Sato | F03G 7/005 |
| | | | 428/394 |
| 2014/0328007 A1 * | 11/2014 | Endo | H01G 9/0036 |
| | | | 29/25.03 |
| 2017/0294273 A1 * | 10/2017 | Andoralov | H01G 9/151 |
| 2018/0047511 A1 * | 2/2018 | Tsuda | H01G 9/07 |
| 2018/0330888 A1 * | 11/2018 | Shi | H01G 9/028 |

\* cited by examiner

ALUMINUM POLYMER CAPACITOR WITH ENHANCED INTERNAL CONDUCTANCE AND BREAKDOWN VOLTAGE CAPABILITY

CROSS-REFERENCE TO RELATED APPLICATIONS

The present invention is a divisional application of pending U.S. patent application Ser. No. 16/558,500 filed Sep. 3, 2019 which is incorporated herein by reference.

BACKGROUND

The present invention is related to capacitors comprising a solid conductive polymeric electrolyte and an optional liquid electrolyte. More specifically, the present invention is related to a capacitor comprising a conductive separator and a method of forming the hybrid capacitor with improved conductive polymer coverage within the interstitial portions of a wound structure.

Capacitors have historically been defined within two general types with one type utilizing a liquid electrolyte and the other type utilizing a solid electrolyte. Liquid electrolyte capacitors, generally, comprise a layered structure typically as a winding with an anode conductor, a cathode conductor and an interleaved separator immersed in a liquid electrolyte all sealed within a container. Solid electrolyte capacitors, generally, include a conductive monolith or foil with a dielectric layer thereon and a solid cathode, such as conductive polymer or manganese dioxide, on the dielectric. Both general types of capacitor have experienced wide spread use in commerce and each has advantages, and disadvantages, not common to the other. For example, liquid electrolytic capacitors have a high capacitance and are capable of high voltages but have a poor Equivalent Series Resistance (ESR) due to poor conductivity of the electrolyte which is typically not above about 0.015 S/cm. Conductive polymers have a high conductivity, up to 600 S/cm, and therefore capacitors utilizing conductive polymeric cathodes have a much lower ESR.

Conductive polymeric cathodes have seen wide spread use in commerce due, at least in part, to their low equivalent series resistance (ESR) and non-destructive failure mode. This leads to a desire to form a hybrid capacitor wherein the conductive polymers commonly employed for solid electrolytic capacitors are utilized within the windings of a liquid electrolyte structure with the goal of achieving the high capacitance and high voltage common with liquid electrolyte capacitors while maintaining the lower ESR common with solid conductive polymeric electrolytes. U.S. Pat. Nos. 8,462,484 and 8,767,377 teach exemplary hybrid capacitors.

The formation of a hybrid capacitor has typically involved the formation of the interleaved wound structure; comprising anode, cathode and separator; followed by impregnation with the conductive polymer. The impregnation has been done by either in-situ polymerization of monomers, or by diffusion of pre-formed polymer slurry into the interstitial areas of the wound interleaved structure.

In-situ polymerization of a monomer in the presence of an oxidizer was used to manufacture a first generation of hybrid capacitors. In-situ polymerization is a complex method with many problems including contamination of the final product by monomer and oxidizer and the work environment conditions are complex leading to poor process reliability especially if the in-situ polymer is applied to the winding. These issues were mitigated by the use of water-based dispersions, or slurries, of pre-formed conductive polymer to impregnate the interstitial spaces of the capacitor winding.

An improvement in hybrid capacitors is presented in commonly assigned U.S. Pat. No. 10,068,713 wherein the polymer layers are formed prior to winding thereby eliminating the problems associated with poor migration into the interstitial areas of the winding. While advantageous, the polymer layers are adjacent, not continuous, which limits the conductivity of the conductive layer.

In spite of the ongoing efforts, those of skill in the art are desirous of an improved hybrid capacitor and method of making an improved hybrid capacitor. The present invention provides a method for making a hybrid capacitor and which exhibits improved electrical quality and reproducibility.

SUMMARY OF THE INVENTION

It is an object of the invention to provide an improved method for forming a hybrid capacitor and an improved capacitor formed by the improved method.

A particular advantage is the ability to provide a hybrid capacitor with improved electrical performance, particularly both higher breakdown voltage capability, and improved conductivity of the conductive polymer portion of the capacitor.

These and other advantages, as will be realized, are provided in a capacitor comprising a working element wherein the working element comprises an anode comprising a first dielectric on the anode, a cathode and a conductive separator between the first dielectric and cathode. The conductive separator comprises a separator and a first conductive polymer wherein the first conductive polymer at least partially encapsulates the separator. A second conductive polymer at least partially encapsulates the first conductive polymer and wherein the first conductive polymer has a higher conductivity than the second conductive polymer. An anode lead is in electrical contact with the anode and a cathode lead is in electrical contact with the cathode.

Yet another embodiment is provided in a method for forming a capacitor. The method comprises:
forming a working element by:
providing an anode comprising a first dielectric and an anode lead;
providing a cathode comprising a cathode lead;
forming a conductive separator comprising a separator and a first conductive polymer wherein the first conductive polymer at least partially encapsulates the separator;
winding the anode and cathode with the conductive separator between the first dielectric and cathode to form a wound capacitor precursor; and
introducing a second conductive polymer into the wound capacitor precursor wherein the second conductive polymer at least partially encapsulates the first conductive polymer

FIGURES

Figure 5:
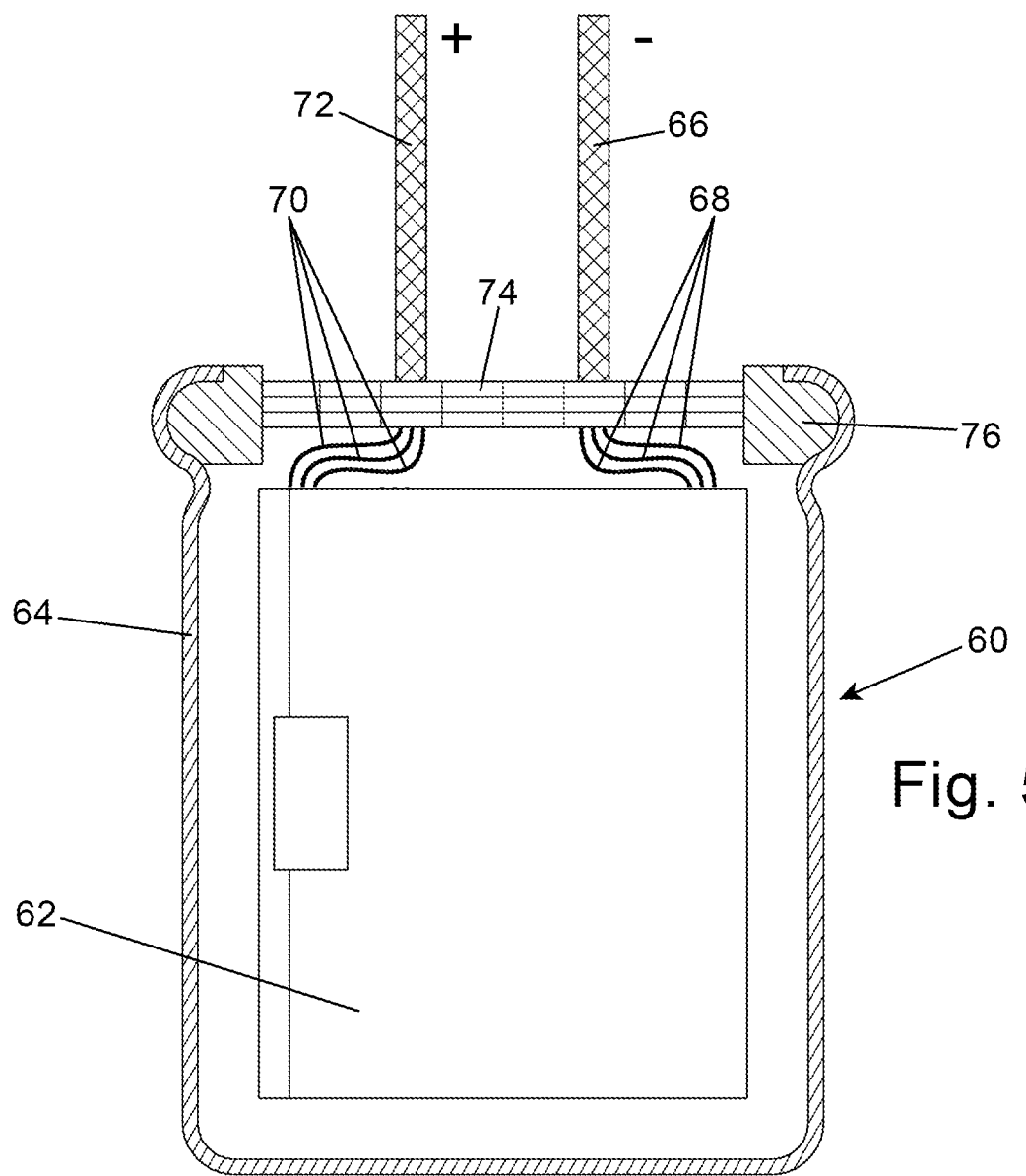

FIG. 5 schematically illustrates an embodiment of the invention is cross-sectional view.

Figure 6:
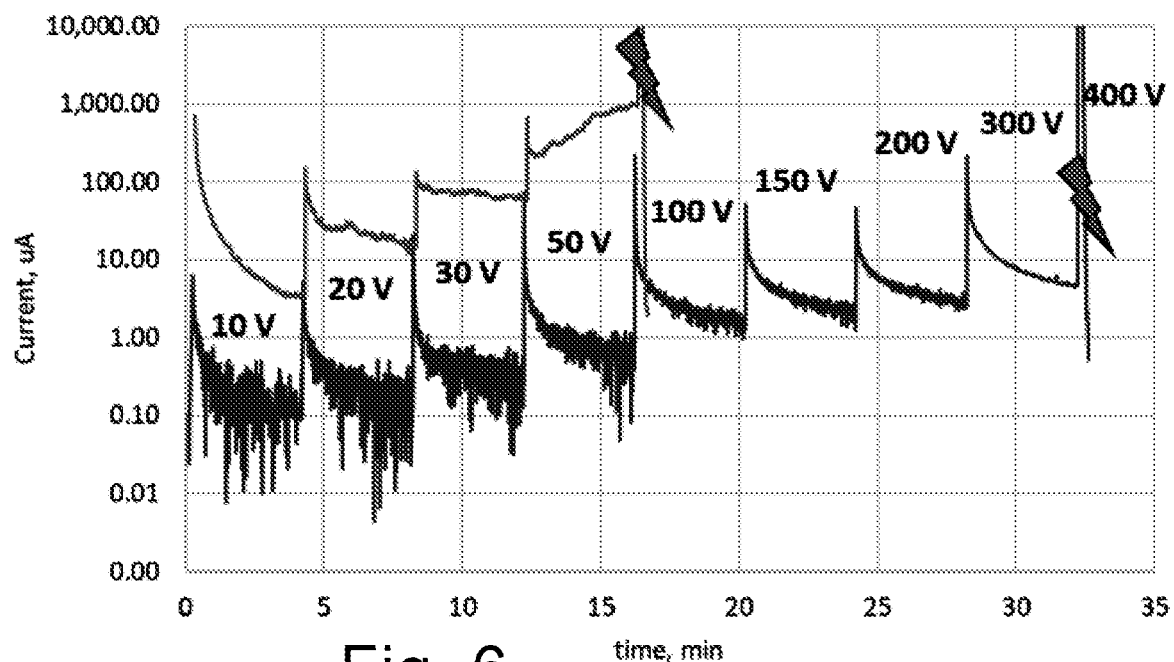
Figure 7:
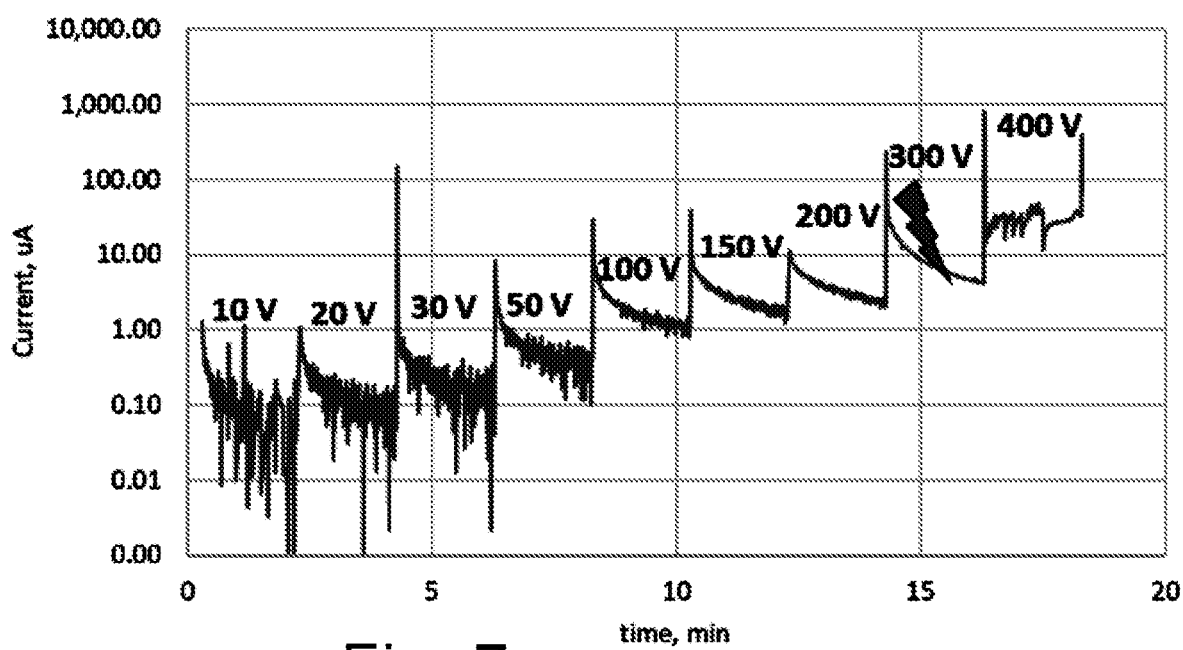

FIGS. 6 and 7 demonstrate the advantages of the invention graphically.

DESCRIPTION

The instant invention is specific to a capacitor, comprising a solid conductive polymer electrolyte and an optional liquid electrolyte interspersed in a wound capacitor comprising interleaved anode, cathode and conductive separator. More specifically, the present invention is directed to a capacitor, and a method of making a capacitor which exhibits improved quality. More specifically, the instant invention allows for the manufacture of capacitors with enhanced performance and specifically high breakdown voltage and/or lower ESR.

An element of the instant invention is the utilization of a conductive separator comprising a first conductive polymer layer a separator wherein the first conductive polymer layer is at least partially encased in a second conductive polymer layer which is applied after winding. The second conductive polymer layer extends from the dielectric to the cathode and forms a, preferably continuous, conductor layer from the dielectric to the cathode with the first conductive polymer layer at least partially encased therein. By incorporating two conductive polymer layers synergistic improvements can be achieved in conductivity thereby improving capacitor performance.

In a particularly preferred embodiment the first conductive polymer layer is formed by in-situ techniques. In-situ formed polymers have a higher conductivity than those formed separately and then applied as a pre-formed polymer. Pre-formed polymers are typically applied as a slurry comprising either particles of conductive polymer or solubilized polymer particles. Preformed conductive polymers have a high breakdown voltage capability. The combination provides a hybrid capacitor wherein the synergism of the different layers provides a hybrid capacitor with a high breakdown voltage capability and a low equivalent series resistance (ESR). Low ESR improves the ripple current capability of the capacitor.

The invention will be described with reference to the various figures forming an integral non-limiting component of the disclosure. Throughout the disclosure similar elements will be numbered accordingly.

Figure 1:
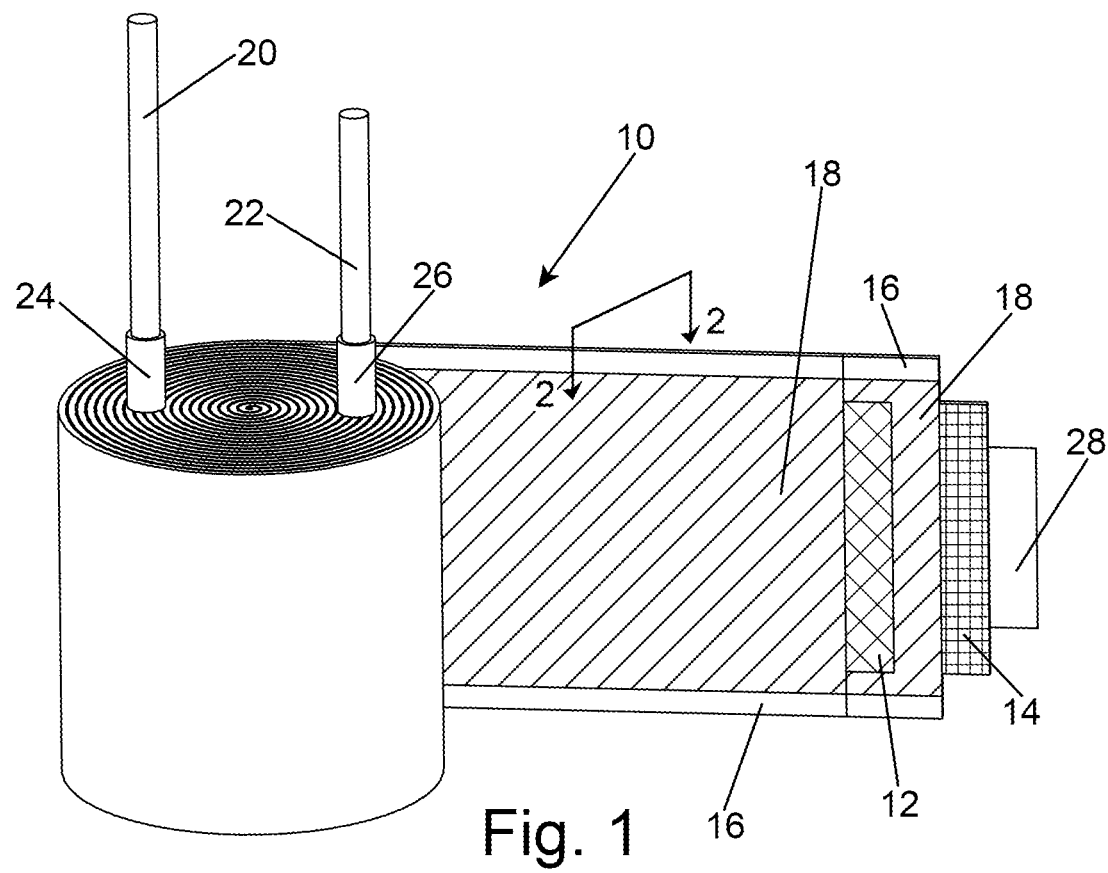
FIG. 1 is a partially unwound schematic perspective view of an embodiment of the invention.

An embodiment of the invention will be described with reference to FIG. 1 wherein a working element is shown in schematic partially unwound view prior to insertion into a container and optionally, but preferably, impregnation with liquid electrolyte. In FIG. 1, the working element, generally represented at 10, comprises an anode, 12, and cathode, 14, with a conductive separator, 16, there between. The conductive separator has a first conductive polymer, 18, either coated on the separator or the separator is impregnated, and preferably saturated, with conductive polymer. An anode lead, 20, and cathode lead, 22, extend from the wound capacitor and ultimately form the electrical connectivity to a circuit. It would be understood from the description that the anode lead is in electrical contact with the anode and the cathode lead is in electrical contact with the cathode and electrically isolated from the anode or anode lead. Tabs, 24 and 26, are commonly employed to electrically connect the anode lead to the anode and the cathode lead to the cathode as known in the art. A closure, 28, such as an adhesive tape inhibits the working element from unwinding during handling and assembly after which the closure has little duty even though it is part of the finished capacitor.

Figure 2:
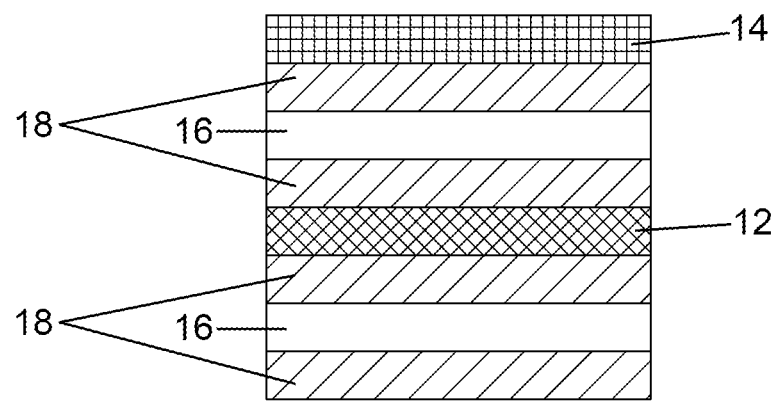
FIG. 2 is a cross-sectional schematic view taken along line 2-2 of FIG. 1.

A cross-sectional view, taken along line 2-2 of FIG. 1, is illustrated schematically in FIG. 2. In FIG. 2, the separator, 16, is shown with conductive polymer, 18, on either side thereof for the purposes of illustration with the understanding that the separator may be impregnated, and preferably saturated, with conductive polymer such that the dimension of the separator is not appreciably altered by the inclusion of conductive polymer. The anode, 12, and cathode, 14, are in a sandwiched relationship separated by the separator, 16. The separator is preferably porous with, optional but preferred, liquid electrolyte moving freely through the separator.

Figure 3:
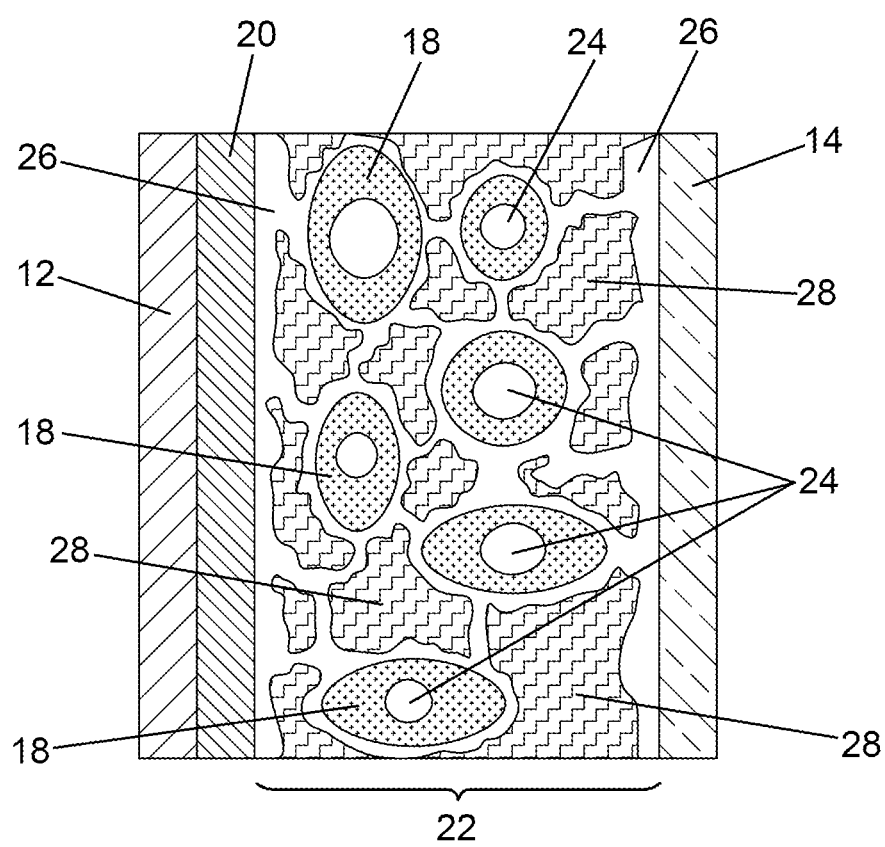
FIG. 3 is a schematic representation of an embodiment of the invention.

An embodiment of the invention will be described with reference to FIG. 3 wherein a portion of a wound capacitor is illustrated in cross-sectional schematic view. In FIG. 3, the anode, 12, and cathode, 14, have a dielectric, 20, and separator layer, 22, there between which forms a capacitive couple. Only one capacitive couple is illustrated herein with the understanding that the wound capacitor would have interleaved and repeating combinations of anode/dielectric/separator layer/dielectric. The separator layer comprises a separator which in one embodiment comprises interwoven fibers, 24. The separator is at least partially, and preferably completely, encapsulated in the first conductive polymer, 18. The first conductive polymer layer is formed from a slurry comprising pre-polymerized polymer or by in-situ polymerization. In-situ polymerization techniques to form a conductive separator are preferred. A second conductive polymer, 26, introduced after winding as will be discussed further herein, forms an electrically conductive path from the dielectric to the first polymer layer to the cathode and at least partially, and preferably completely, encapsulates the first conductive polymer. The second conductive polymer is preferably formed by the introduction of a pre-formed conductive polymer without limit thereto. An optional, but preferred, liquid electrolyte, 28, at least partially, and preferably completely, fills all interstitial areas of the separator.

It is preferred that the first conductive polymer layer, 18, be more conductive than the second conductive polymer, 26. More preferably, the conductivity of the first conductive polymer is at least 150% to no more than 2500% of the conductivity of the second conductive polymer. By way of non-limiting example, if the second conductive polymer has a conductivity of 40 S/cm the first conductive polymer has a conductivity of at least 60 S/cm to no more than 1000 S/cm. The average particle size of the first conductive polymer is preferably higher than the average particle size of the second conductive polymer.

It is preferable that the breakdown voltage of the second conductive polymer is higher than the breakdown voltage of the first conductive polymer when measured independently, in identical fashion, either after initial formation or after a temperature stress such as 1000 hours at 125° C. More preferably, the breakdown voltage of the second conductive polymer is at least 20% higher to no more than 700% higher than the breakdown voltage of the first conductive polymer.

It is preferable that the work function of the second conductive polymer is higher than the work function of the first conductive polymer. More preferably, the work function of the second conductive polymer is at least 0.2 eV to no more than 1.2 eV higher than the first conductive polymer. Work function modifiers are well known in the art as exemplified by U.S. Pat. Nos. 10,340,091 and 10,204,743.

Figure 4:
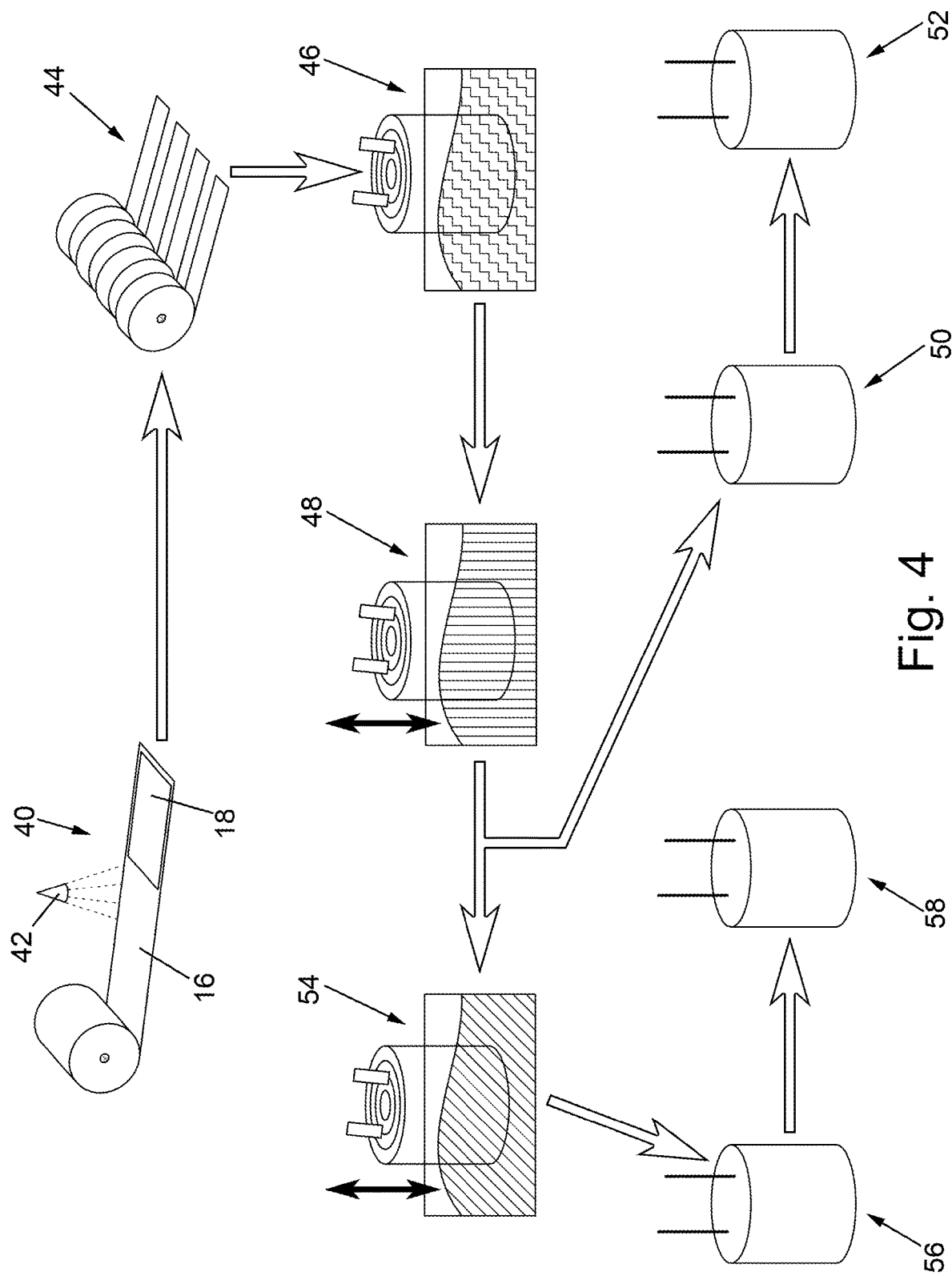
FIG. 4 is a schematic representation of an embodiment of the invention.

An embodiment of the invention will be described with reference to FIG. 4 wherein the process of forming the capacitor is illustrated in schematic view. In FIG. 4, a polymer layer, 18, is formed on a separator, 16, by the application of a slurry comprising preformed conductive polymer or by application of oxidizer and monomer to form a polymer layer on the separator which is referred to in the art as in-situ polymerization. The applicator, 42, for oxidizer and precursor is not particularly limited herein with any acceptable method for forming a polymer by in-situ polymerization techniques suitable for demonstration of the invention. The formation of the polymer on the separator can be done as a master roll which is then slit into rolls of conductive separator at 44 with a width suitable for formation of a wound capacitor. The separator can be split prior to polymer formation, however, this is less desirable due to manufacturing conveniences. A layered rolled structure is formed as known in the art comprising an anode and cathode with the conductive separator there between. The dielectric can also be further formed, if necessary, at 46. The wound structure is impregnated with the second conductive polymer preferably by introduction of a pre-formed polymer to the interstitial portions of the winding at 48, followed by drying. In one embodiment the wound structure impregnated with the second conductive polymer is assembled at 50 followed by aging and testing at 52. If a liquid electrolyte is to be incorporated the liquid electrolyte is added at 54, using conventional techniques, and the capacitor is assembled at 56 followed by aging and testing at 58. Assembly includes the incorporation of the capacitor in a housing and sealing.

The cathode foil, separators and anode foil are typically provided as a wide roll and slit to size. The anode foil is preferably etched and a dielectric is formed thereon. The dielectric may be formed prior to slitting in which case a subsequent step is desirable to form dielectric on the slit edge. The separator may be treated with a coupling agent, to improve adhesion between the surface and conductive polymer layer, or to impart other specific surface behaviors. The conductive separator may be washed and dried before or after conductive polymer layer formation or impregnation and the conductive polymer layer formation or impregnation step may be repeated several times if required. Electrical leads, or tabs, are typically electrically connected to the anode and cathode, preferably prior to cutting to length and the leads may be treated with masking material to protect them from farther modification and to keep them ready for welding to capacitor terminals.

The conductive polymer is applied to the separator by any suitable method including immersion, coating, and spraying. In immersion the separator is pulled through a series of baths or vessels with sequential application of monomer and oxidizer in either order. Immersion is preferred for the separator. Coating and spraying may be done with any printing technique including screen printing or spraying of a monomer or oxidizer either sequentially, in any order, or simultaneously onto the surface of the separator. It is preferable that the conductive polymer coating be applied to the separator at an amount of at least 0.1 mg/cm$^2$. Below about 0.1 mg/cm$^2$ the coating weight is insufficient for adequate conduction and incomplete coating may result. It is preferable that the conductive polymer coating be applied in an amount sufficient to achieve a coating weight of no more than about 10 mg/cm$^2$. Above about 10 mg/cm$^2$ the added coating thickness does not appreciably increase the conductivity.

Multi-tab or multi-leads minimizes the foil resistance effect and are preferred. With a single lead the current must flow from the furthest extent of the foil to the tab and lead which is detrimental to ESR. It is preferable to utilize multiple anode leads and multiple cathode leads thereby decreasing the conductive path length.

A capacitor is illustrated in cross-sectional schematic view in FIG. 5. In FIG. 5, the capacitor, generally represented at 60, comprises a working element, 62, as described herein, within a housing, 64. The housing, which may be referred to as a can in the art, is preferably conductive and may function as a lead or be in electrical contact with a cathode lead, 6. Cathode tabs, 68, are in electrical contact with the housing or cathode lead. Anode tabs, 70, are in electrical contact with an anode lead, 72. A lid, 74, and seal, 76, such as a gasket, seals the housing to inhibit atmospheric exchange between the interior of the housing and ambient atmosphere. In one embodiment the seal is a hermetic seal.

The anode is a conductive metal preferably in the form of a foil. The conductive metal is preferably a valve metal or a conductive oxide of the valve metal. Particularly preferred anodes comprise a valve metal such as tantalum, aluminum, niobium, titanium, zirconium, hafnium, alloys of these elements, or a conductive oxide thereof such as NbO. Aluminum is a particularly preferred anode material.

An oxide film is formed on the anode as the dielectric. The dielectric may be formed using any suitable electrolyte solution, referred to as a forming electrolyte, such as a phosphoric acid or a phosphate-containing solution, boric acid, borate containing solution or ammonium adipate. A formation voltage of from about 9 V to about 450 V is commonly applied. The formation voltage typically ranges from 1.5 to 3.5 times the rated voltage of the capacitor.

The conductive polymer application process is generally selected from in-situ polymer formation and application of a preformed polymer from a slurry such as by a coating process. For the in-situ process impregnating solutions are applied to the surface wherein the impregnating solutions preferably contain monomer, oxidizing agent, dopant and other adjuvants as known to those of skill in the art. The selection of a suitable solvent for the solution is well within the level of skill in the art. Examples of suitable solvents include ketones and alcohols such as acetone, pyridine, tetrahydrofuran, methanol, ethanol, 2-propanol, and 1-butanol. The monomer concentration may be from about 1.5 wt. % to about 20 wt. %, more preferably from about 5 wt. % to about 15 wt. % for demonstration of the invention. Suitable monomers for preparing conductive polymers include but are not limited to aniline, pyrrole, thiophene, and derivatives thereof. A preferred monomer is 3,4-ethylenedioxythiophene. The oxidizing agent concentration may be from about 6 wt. % to about 45 wt. % and more preferably from about 16 wt. % to about 42 wt. % for demonstration of the invention. Oxidizing agents for preparing conductive polymers include Fe(III) salts of organic and inorganic acids, alkali metal persulfates, ammonium persulfate, and others. A preferred oxidant for demonstration of the invention is Fe(III) tosylate. The dopant concentration may be from about 5 wt. % to about 30 wt. % and more preferably from about 12 wt. % to about 25 wt. %. Any suitable dopant may be used, such as polystyrene sulfonate, dodecyl benzenesulfonate, p-tosylate, or chloride. The preferred dopant is p-tosylate. The substrates are cured at a temperature of from 65° C. to about 160° C. and more preferably from about 80° C. to about 120° C. thereby allowing the monomer to polymerize. After curing, the polymer layer is preferably washed in deionized water or another solvent.

Application of a preformed polymer from a slurry after winding is a preferred method for introducing the second conductive polymer into the winding. The polymer can be prepared as a slurry or obtained commercially as a slurry, without particular limit to the technique, preferably followed by drying. A slurry of polymerized 3,4-ethylenedioxythiophene doped with polystyrene sulfonate or another suitable dopant, with a particle size of no more than 200 nm, preferably at least 1 nm to no more than 200 nm, more preferably at least 20 nm to no more than 200 nm, in a solvent is exemplary for demonstration of the invention. A particularly preferred slurry has an indistinguishable particle size by scatter techniques and is referred to as a soluble conductive polymer The liquid electrolyte is a solvent preferably with a supporting salt therein. Any conventional solvent can be used with exemplary solvents including γ-butyrolactone, sulfolane, ethylene carbonate, propylene carbonate, dimethyl carbonate, ethyl methyl carbonate, acetonitrile, propionitrile, dimethyl formamide, diethyl formamide, water, silicone oil, polyethylene glycol and mixtures thereof. Though not required a supporting salt is preferred. Exemplary supporting salts include inorganic acid ammonium salts, inorganic acid amine salts, inorganic acid alkyl substituted amide salts, organic ammonium salts, organic acid amide salts, organic acid alkyl substituted amide salts and derivatives thereof. Any gas absorbents or cathode electrochemical depolarizers can be used. Exemplary supported additives include nitro derivatives of organic alcohols, acids, esters, aromatic derivatives such as o-, m-, p-nitroanisole, o-,m-,p-nitrobenzoic acid, o-,m-,p-nitrobenzene alcohol. A particularly preferred hybrid capacitor comprises up to 50 wt % liquid electrolyte.

The separator is not particularly limited herein and any commercially available separator can be used to demonstrate the invention with the proviso that it is a material used for the conductive separator can either be coated with, or impregnated with, a conductive polymer. Alternatively, or in addition to the conductive polymer, the separator may itself be a conductive material. Exemplary separators for the conductive separator function as a skeleton layer for the conductive polymer. The separator can be fabricated in the form of a sheet of different dimensions which can be wound in rolls. The anode foil can function as a support for the separator wherein the anode foil has an insulator layer formed on the surface thereof with a conductive polymer coating on the insulator and with a conductive separator layer formed on the polymer coating. The use of the anode as a support may minimize operating difficulty. The separator comprises a porous conductive layer which allows direct electrical contact between the anode conductive polymer layer and a cathode. Preferably, the separator has a volume of pores for liquid electrolyte to transit through. Paper or other non-conductive materials, such as polymers, can be used as support for the conductive polymer. Paper is an exemplary separator due to the widespread use and availability. Unlike prior art capacitors the paper does not need to be charred for use as a conductive separator. In the manufacture of prior art capacitors the paper is often charred after formation of the working element to minimize the amount of polymer absorbed into the paper. With the present invention this is unnecessary since the separator is either coated with conductive polymer or impregnated with conductive polymer to form the conductive separator. The separator may be a fibrous material, such as paper fiber, either physically intermingled or cross-linked to form a continual fibrous, such as paper fiber, layer. The space between the fibers might be partly or fully filled with the highly conductivity component. Paper based separators can be manufactured by modification of a finished paper layer or by modification of paper with high conductivity component fibers before forming of paper layer, a dispersion of conductive fibers, pieces, particles or their agglomerates in a liquid or solid state or a deposition of conductive fibers, pieces, particles. The conductive fibers, pieces or particles may comprise a conductive material such as conductive polymer, carbon black, graphite, metal etc., or can be a composite material consisting of a non-conductive core such as paper, plastic etc., modified with a conductive material such as conductive polymer, carbon black, graphite, metal etc.

The conductive separator and non-conductive separator may comprise the same material with the conductive separator having a conductive coating thereon or being impregnated with a conductor neither of which is necessary in the non-conductive separator.

A particularly preferred separator has a width which is suitable for the working element length or production process with a width of 1.5 cm to 500 cm being exemplary for demonstration of the invention. The length is chosen based on the desired capacitance as capacitance is a function of anode and cathode overlap and is therefore directly related to length and width of the cathode and anode. A separator with a length of for 0.1 m to 400 m and thickness of 10 μm up to 300 μm is exemplary for demonstration of the invention.

The conductive polymer is preferably selected from polyaniline, polypyrrole and polythiophene or substitutional derivatives thereof.

A particularly preferred conducting polymer is represented by Formula I:

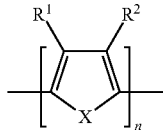

FORMULA 1 wherein $R^1$ and $R^2$ are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups be small to avoid steric interferences. For these reasons $R^1$ and $R^2$ taken together as —O—$(CH_2)_2$—O— is most preferred. In Formula 1, X is S, N or O and most preferable X is S. A particularly preferred conductive polymer is polymerized 3,4-polyethylene dioxythiophene (PEDOT).

$R^1$ and $R^2$ independently represent linear or branched C1-C16 alkyl or C2-C18 alkoxyalkyl; or are C3-C8 cycloalkyl, phenyl or benzyl which are unsubstituted or substituted by C1-C6 alkyl, C1-C6 alkoxy, halogen or $OR^3$; or $R^1$ and $R^2$, taken together, are linear C1-C6 alkylene which is unsubstituted or substituted by C1-C6 alkyl, C1-C6 alkoxy, halogen, C3-C8 cycloalkyl, phenyl, benzyl, C1-C4 alkylphenyl, C1-C4 alkoxyphenyl, halophenyl, C1-C4 alkylbenzyl, C1-C4 alkoxybenzyl or halobenzyl, 5-, 6-, or 7-membered heterocyclic structure containing two oxygen elements. $R^3$ preferably represents hydrogen, linear or branched C1-C16 alkyl or C2-C18 alkoxyalkyl; or are C3-C8 cycloalkyl, phenyl or benzyl which are unsubstituted or substituted by C1-C6 alkyl. In a particularly preferred embodiment $R^3$ comprised an anionic group with a corresponding cationic group wherein Formula I is an intrinsically conductive polymer without the necessity of a counterion which is referred to as a self-doping polymer.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

Other adjuvants, coatings, and related elements can be incorporated into a capacitor, as known in the art, without diverting from the present invention. Mentioned, as a non-limiting summary include, protective layers, multiple capacitive levels, terminals, leads, etc.

The inventive capacitor has a rated voltage of at least 15 volts to no more than 400 volts and more preferably no more than 500 volts wherein rated voltage is approximately 50% of the dielectric formation voltage.

Examples

A cellulose fibers based material with density 0.35 g/cm3, thickness 50 um was used as separator and treated with commercially available polymerized 3,4-polyethylene dioxythiophene provided as a slurry to form an at least partially encapsulated control conductive separator. The control separator was dipped in slurry twice, the slurry was dried initially at 80° C. and then at 150° C. to form a solid coating. An identical cellulose fibers separator was treated by immersion in a solution comprising iron tosylate as an oxidizer and, after drying for 3 hours at ambient temperatures, in a solution comprising 3,4-ethylene dioxythiophene monomer. Polymerization of the monomer was allowed to proceed for 3 hours at ambient temperature followed by 3 hours at 40° C. to form polymerized 3,4-polyethylene dioxythiophene thereby forming an inventive conductive separator. The inventive conductive separator was washed in ethanol, dried and cured at for 40° C. for one hour and at 125° C. for 3 hours. The resistance of each conductive separator was tested multiple times with the same probe resulting in a resistance of 4.6 (±0.44) ohms for the inventive conductive separator and 8.1 (±0.49) ohms for the control conductive separator. The inventive conductive separator demonstrated an increase in conductivity improvement of about 76% relative to the control.

Three capacitors were made for the purposes of demonstrating the invention. Each was based on a 720 Vf aluminum foil with a dielectric formed up to 500 V in a boric acid solution after slitting. Capacitor 1 was formed by forming an in-situ polymer on the dielectric comprising polymerizing 3,4-ethylene dioxythiophene with iron tosylate. Capacitor 2 was prepared with the same conductive separator as Capacitor 1 wherein the a polymer slurry of polymerized 3,4-polyethylene dioxythiophene was incorporated as the second conductive polymer after assembling. Capacitor 3 was prepared the same as Capacitor 2 except that a high voltage liquid electrolyte (Vs-450V) was included. The results are presented in FIGS. 6 and 7. In FIG. 6 the upper trace represents the result for Capacitor 1 and the lower trace represents the results for Capacitor 3. FIG. 7 represents the results for Capacitor 2.

As shown in FIGS. 6 and 7, for Capacitors 2 and 3, correspond to the scheme presented in FIG. 3, the voltage capability for the prototypes was higher than 200V. The first spark occurred at 300V for Capacitor 2 but the leakage current remained stable and multiple sparks with current instability occurred at 400V. For this structure 300V was the limit in voltage. The inventive samples demonstrated good leakage current performance and multiple failures were observed and detected as current instability at 400V. The full in-situ capacitor structure demonstrated the worse results. First, leakage current was almost 2 orders higher vs. the inventive capacitors even at very low voltages such as 10V-30V. At 50V leakage current begun to rise significantly and this can be already considered as voltage limit. At 100V Capacitor 2 failed with a short circuit failure mode.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A method for forming a capacitor comprising:
    forming a working element by:
    providing an anode comprising a first dielectric and an anode lead;
    providing a cathode comprising a cathode lead;
    forming a conductive separator comprising a separator and a first conductive polymer wherein said first conductive polymer at least partially encapsulates said separator;
    winding said anode and said cathode with said conductive separator between said first dielectric and said cathode to form a wound capacitor precursor; and
    introducing a second conductive polymer into said wound capacitor precursor wherein said second conductive polymer at least partially encapsulates said first conductive polymer.

2. The method for forming a capacitor of claim 1 wherein said first conductive polymer is formed by in situ polymerization techniques.

3. The method for forming a capacitor of claim 1 wherein said introducing slurry into said wound capacitor precursor wherein said slurry comprises a pre-formed conductive polymer.

4. The method for forming a capacitor of claim 1 wherein said first conductive polymer has a higher conductivity than said second conductive polymer.

5. The method for forming a capacitor of claim 4 wherein said first conductive polymer has a first conductivity and said second conductive polymer has a second conductivity wherein said first conductivity is at least 150% to no more than 2500% of said second conductivity.

6. The method for forming a capacitor of claim 1 wherein said first conductive polymer has a first breakdown voltage and said second conductive polymer has a second breakdown voltage wherein said second breakdown voltage is higher than said first breakdown voltage.

7. The method for forming a capacitor of claim 6 wherein said second breakdown voltage is 120% to 700% of said first breakdown voltage.

8. The method for forming a capacitor of claim 1 wherein said first conductive polymer has a first work function and said second conductive polymer has a second work function wherein said second work function is higher than said first work function.

9. The method for forming a capacitor of claim 8 wherein said second work function is at least 0.2 eV to no more than 1.2 eV higher than said first work function.

10. The method for forming a capacitor of claim 1 further comprising:
adding a liquid electrolyte to said working element wherein said liquid electrolyte is between said dielectric and said cathode.

11. The method for forming a capacitor of claim 1 wherein said conductive separator has a first conductive polymer coating weight of at least 0.1 mg/cm$^2$ to no more than 10 mg/cm2.

12. The method for forming a capacitor of claim 1 wherein said conductive separator comprises a separator with said first conductive polymer coated on said material or said first conductive polymer impregnates said separator.

13. The method for forming a capacitor of claim 12 wherein at least one of said first conductive polymer or said second conductive polymer comprises a polymer selected from the group consisting of polyaniline, polythiophene and polypyrrole.

14. The method for forming a capacitor of claim 13 wherein said polythiopene is poly 3,4-ethylenedioxythiophene.

15. The method for forming a capacitor of claim 13 wherein said first conductive polymer or said second conductive polymer is a self-doping polymer.

16. The method for forming a capacitor of claim 1 comprising forming multiple anode leads or multiple cathode leads.

17. The method for forming a capacitor of claim 1 wherein at least one of said anode or said cathode comprises a valve metal.

18. The method for forming a capacitor of claim 17 wherein said valve metal is selected from the group consisting of tantalum, aluminum, niobium, titanium, zirconium, hafnium, alloys of these elements and a conductive oxide thereof.

19. The method for forming a capacitor of claim 18 wherein said valve metal is aluminum.

20. The method for forming a capacitor of claim 1 having a rated voltage of at least 15 volts to no more than 500 volts.

21. The method for forming a capacitor of claim 1 wherein said first conductive polymer has an average particle size which is higher than an average particle size of said second conductive polymer.

22. The method for forming a capacitor of claim 21 wherein said second conductive polymer is a soluble conductive polymer.

23. The method for forming a capacitor of claim 21 wherein said second conductive polymer has a particle size of no more than 200 nm.

24. The method for forming a capacitor of claim 21 wherein said particle size is at least 1 nm.

25. The method for forming a capacitor of claim 24 wherein said particle size is at least 20 nm.

* * * * *